Jan. 5, 1960 G. H. JONKER ET AL 2,920,276

DEVICE FOR MODULATING AND/OR AMPLIFYING ELECTRIC SIGNALS

Filed March 3, 1954

INVENTORS
GERARD HEINRICH JONKER
JOHANNES MEYER CLUWEN

BY [signature]

AGENT 2,920,276

DEVICE FOR MODULATING AND/OR AMPLIFYING ELECTRIC SIGNALS

Gerard Heinrich Jonker and Johannes Meyer Cluwen, Eindhoven, Netherlands, assignors, by mesne assignments, to North American Philips Company, Inc., New York, N.Y., a corporation of Delaware Application March 3, 1954, Serial No. 413,898

Claims priority, application Netherlands March 4, 1953

17 Claims. (Cl. 330—10)

This invention relates to devices for modulating electric signals on an auxiliary oscillation whose frequency is higher than the signal frequency. The invention moreover concerns a device for amplifying electric signals by demodulating the modulated oscillation thus obtained. The invention has more particularly for its object to provide a simple decoupling between the signal and the signal oscillation and moreover permits a number of signals to be modulated and amplified simultaneously in a simple manner.

The invention is characterized by at least one piezo-electric member having electrodes associated therewith and having an electro-mechanical coupling factor which depends upon the electric voltage, the auxiliary oscillation producing the modulated oscillation by electro-mechanical transmission at an electrode to which the signal is supplied.

In order that the invention may be carried into effect it will now be described in greater detail with reference to the accompanying drawing, given by way of example, in which Fig. 1 shows a particular form of the device according to the invention.

Figure 1:
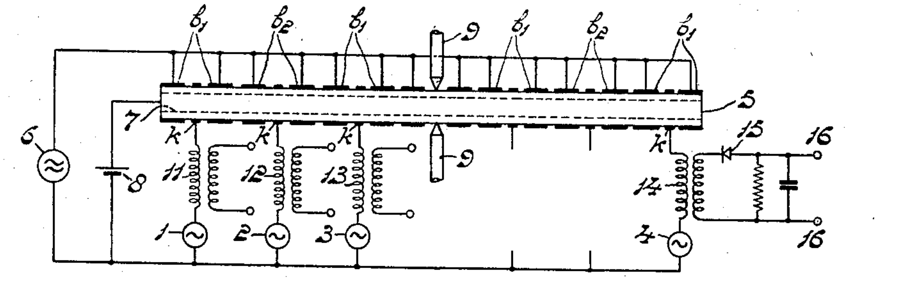

The device shown in Fig. 1 for modulating and/or amplifying signals from sources 1, 2, 3, 4 comprises a member 5 made from piezo-electric material with an electro-mechanical coupling factor depending upon the electric voltage. This property is, for example, inherent in barium titanate, if desired blended with other titanates, with zirconates or stannates, in lead zirconate several tantalates and niobates, from which materials tubes and rods of polycrystalline structure can easily be formed by sintering. The term "electromechanical coupling factor" is to be understood to mean the square root of the ratio of the mechanical energy produced as a result of applying an electrical field divided by the electrical energy required. As is well known said ratio is equal to that existing between the produced electrical energy and the mechanical energy required.

The member 5 is tubular and comprises annular outer electrodes $b_1$, $b_2$ to which are supplied auxiliary oscillations from a source 6, annular outer electrodes *k*, to which the signals are supplied, and furthermore an inner electrode 7 which extends throughout the inner surface and has a constant potential. Although the inner electrode 7 is constructed as a single element, it is, in effect, a plurality of electrodes respectively associated with all of the electrodes $b_1$, $b_2$, and *k*, thus providing a plurality of pairs of electrodes.

The member 5 may alternatively be rod-shaped having an electrode, corresponding to the inner electrode 7 shown in Fig. 1, provided at one side throughout the length of the rod, and electrodes *b* and *k* provided at the opposite side of the rod. However, this construction is not inviting from a mechanical point of view. The auxiliary oscillations on the electrodes *b* thus produce mechanical vibrations in the member 5, said electrodes, in order to secure a high degree of conversion into mechanical energy, that is to say a high electro-mechanical coupling factor, being polarized in a suitable manner, for example by applying for several hours a high electric direct voltage corresponding to a field strength of several thousand v./mm. between said electrodes and the inner electrode 7.

The generated mechanical vibrations, in turn, produce corresponding electrical oscillations at the electrodes *k*. Since these electrodes *k* moreover receive the signals from the sources 1, 2, 3 and 4 respectively, the electro-mechanical coupling factor is varied in accordance with said signals so that oscillations modulated on the auxiliary oscillation are produced at the electrodes *k*. Said oscillations may be taken off via high frequency transformers 11, 12, 13, 14 and, if desired, demodulated as shown by an amplitude detector 15, thus producing the amplified signal at the terminals 16.

In this manner a number of signals—in the present example the signals from the sources 1, 2, 3 and 4—can be modulated and/or amplified simultaneously. Of course, however, the device may alternatively serve to modulate and/or amplify only a single signal.

The signal may be a low-frequency oscillation and in this event the electro-mechanical coupling factor should vary approximately linearly with the signal. The material of the member 5 then preferably has such a structure that the ratio between the remanent polarization and the saturation polarization is low, for example, smaller than 0.3. The term "saturation polarization" is to be understood to mean the limit to which the non-linear part of the polarization approaches at a comparatively high instantaneous value of the electric field produced by the signal, the term "remanent polarization" being understood to mean the polarization left in the material after saturation at a signal zero.

The signal may alternatively be shaped as a stepwise changing voltage such, for example, as occurs in calculating apparatus (counting circuits) or in automatic telephony. In this event use may be made of the remanent polarization of the material of the member 5 which is then preferably as high as possible in comparison to the saturation polarization, for example, in excess of 0.6 times the saturation polarization. By coupling the electrodes *k* with inductances suitably chosen with regard to the capacity value of the electrodes *k* with a comparatively high amplitude of the auxiliary oscillation of source 6 it can alternatively be achieved that the produced modulated oscillation changes stepwise, i.e. abruptly, between two values in accordance with the signal (dynamic trigger).

It will be appreciated that a similar stepwise change is alternatively obtainable by feedback of the produced amplified oscillation.

In order to obtain an appreciable modulation depth of the produced modulated oscillation the pre-polarization of the electrodes *k* should be small, and more particularly small relative to that of the electrodes *b*, it corresponding, for example, to a field strength of several times ten v./mm. If desired, it may be dispensed with, for example by slightly biassing the inner electrode 7 by means of the source 8. Alternatively it can be achieved, by providing a capacitative coupling between the electrodes *b* and *k*, that amplitude- or phase-modulated oscillations are produced via the transformers 11, 12, 13 and 14 respectively dependent upon the ohmic or reactive nature of the output impedance (not shown), said oscillations being, if desired, modulated in any known manner. The signal may alternatively be supplied in push-pull to two electrodes $k$.

Figure 2:
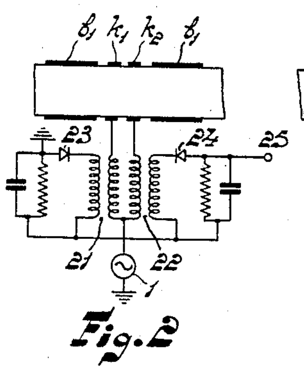
Figs. 2, 3, 4 and 8 show four variants of the modulation portion of the device shown in Fig. 1, which are particularly suitable for push-pull modulation and push-pull amplification respectively.

In Fig. 2 two electrodes $k_1$ and $k_2$ are provided approximately at the same node of the mechanical vibration and slightly pre-polarized in opposite sense, the signal from the source 1 being supplied in the same phase to the two electrodes $k_1$ and $k_2$. The modulated oscillations produced via transformers 21 and 22 are demodulated by means of push-pull connected detectors 23 and 24 so that a push-pull amplified signal is produced at the terminal 25.

Figure 3:
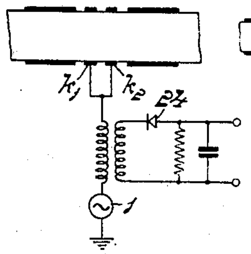

A similar push-pull amplification is obtained, if, as shown in Fig. 3, said two electrodes $k_1$ and $k_2$ to which the signal oscillations from the source 1 are supplied in the same phase, are given an opposite slightly different pre-polarization the amplitude-modulated oscillations produced in the common circuit of the electrodes $k_1$, $k_2$ and the signal source subsequently being demodulated by means of the detector 24.

Figure 4:
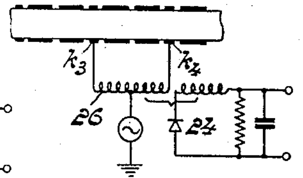

Fig. 4 shows a variant of the device depicted in Fig. 3, in which the electrodes $k_3$ and $k_4$ situated at two succeeding nodes of the mechanical vibration likewise have an opposite, slightly different pre-polarization, the oscillation subsequently being demodulated by means of the detector 24 in the bridge-arm 26 between said electrodes $k_3$ and $k_4$.

Figure 5:
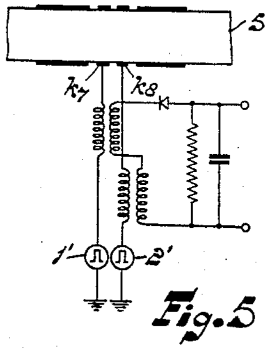
Fig. 5 shows a variant of the modulation portion of the device shown in Fig. 1, which is particularly suitable for step function signals.

When it is more particularly desired to utilize the remanent polarization left by a signal 1′ in the member 5 (Fig. 5) in the vicinity of the associated electrode $k_7$, use will often be made of a second electrode $k_8$ to which no signal or a comparison signal 2′ is supplied, so that the difference of the oscillations produced at the electrodes $k_7$ and $k_8$ is comparatively large and negligible respectively in amplitude in accordance with the sign of said remanent polarization. If desired, the comparison auxiliary oscillation may be derived directly from the source.

A considerable increase of the electro-mechanical coupling factor and consequently of the amplitude of the produced modulated oscillation is obtained if the frequency of the auxiliary oscillation of the source 6 corresponds to a resonance frequency, preferably a higher harmonic of the mechanical fundamental vibration of the member 5. The higher the auxiliary frequency is relative to the signal frequency, the higher is the amplification factor with which the signal is found to be amplified. To this end the member 5 is supported at any of the nodal planes of the mechanical vibration, as shown diagrammatically by the bolts 9. Alternatively, the member is often supported at two nodal planes situated at both sides of the centre by means of easily yielding material such as, for example, sponge rubber.

If the auxiliary oscillation from the source 6 is supplied in the same phase to the electrodes $b_1$ and $b_2$ respectively as shown in Fig. 1, said electrodes situated at both sides of an antinode of the mechanical vibration should alternately be pre-polarized oppositely with regard to the inner electrode 7. If, in contradistinction thereto, the electrodes $b_1$ and $b_2$ have the same sense of polarization relative to the inner electrode 7, the auxiliary oscillation from the source 6 should be supplied in opposite phase to the electrodes $b_1$ and $b_2$ respectively.

The electrodes $k$ are preferably provided at the said nodal planes. As a result of this positioning all the electrodes $b_1$ and $b_2$ respectively contribute to the increase in electric voltage produced at the electrodes $k$ and this to a larger degree as the electrodes $b$ are made longer in the direction of the axis of the member 5. Therefore, this length is preferably made to exceed that of the electrodes $k$.

Contrary thereto, a feasibility especially for use in counting circuits is to supply the auxiliary oscillation as a travelling wave, for example, a mechanical pulse, to one side of the member 5 which is clamped at its other end in damping material in order to prevent reflection of the mechanical vibration. In this event alternately modulated oscillations, more particularly impulses, are produced via the transformers 11, 12, 13, the amplitude of said oscillations corresponding to that of the signals of the sources 1, 2, 3. As an alternative, the auxiliary oscillation may be made operative as an oscillation of short duration corresponding to a mechanical resonance frequency of the member 5.

Neither is it necessary for the auxiliary oscillation to be supplied as an electrical oscillation to the electrodes $b$. It may alternatively be supplied as a mechanical vibration directly to the member 5, the conversion of mechanical energy into electrical energy subsequently depending again on the electrical signals supplied to the electrodes $k$. The auxiliary oscillation may then be supplied to a plurality of members 5 via a medium conveying the mechanical vibration. Of course, the source 6 may alternatively supply the auxiliary oscillation electrically to a plurality of members (not shown).

The source 6 may be a tube or transistor amplifier with regenerative feedback. The amplitude of the auxiliary oscillation produced by it should fluctuate as little as possible with load variations in order to avoid "crosstalk" from one signal source on the circuit of the other.

Figure 6:
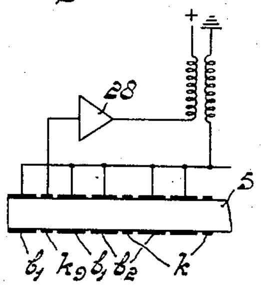
Figs. 6 and 7 are detail views of means for producing the auxiliary oscillation in the device shown in Fig. 1.

Fig. 6 shows an example in which the member 5 itself forms part of the feed-back circuit of such an amplifier. To this end one of the electrodes, preferably an electrode $k_9$ of the member 5, situated at a node of the mechanical vibration, is connected via an amplifier 28 to all or at least the major part of electrodes $b_1$ and $b_2$, so that electrtical and consequent mechanical vibrations are generated as a result of damping reduction by the amplifier. Of course, the produced oscillation moreover depends upon any signal oscillation supplied to the electrode $k_9$. A carbon microphone coupled mechanically to the member 5 may then act as an amplifier 28.

Figure 7:
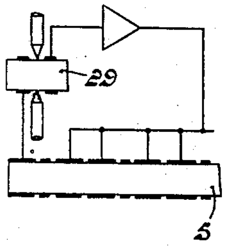

The amplifier 28 may, if desired, comprise further selective elements in addition to the member 5, for example a resonant circuit in order to produce solely the auxiliary frequency corresponding to the desired higher harmonic of the mechanical fundamental frequency of the member 5. Said resonant circuit may further comprise means causing its resonance frequency to vary with temperature similarly to the said harmonic. To this end, as shown in Fig. 7, it may be a short vibrator member 29 made from the same material as that of the member 5, but whose mechanical fundamental frequency corresponds to said harmonic.

Figure 8:
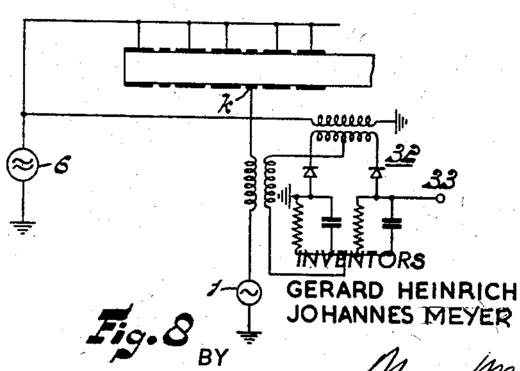

Fig. 8 shows a further device for push-pull amplification of the signal oscillations from the source 1, in which the modulated oscillations produced at the non pre-polarized electrode $k$ are supplied, jointly with oscillations derived from the auxiliary source 6, to a push-pull demodulator 32 to the effect of generating the push-pull amplified oscillations at an output terminal 33.

What is claimed is:

1. A modulator device comprising a piezo-electric member having at least one pair of electrodes associated therewith, said member having an electro-mechanical coupling factor dependent upon the electric voltage thereacross, a source of a modulating signal connected to said pair of electrodes, a source independent of said piezo-electric member for producing an auxiliary oscillation having a frequency higher than the frequency of said modulating signal, means other than said pair of electrodes for coupling said source of auxiliary oscillation to said member to cause mechanical transmission of said auxiliary oscillation to said pair of electrodes thereby producing modulation of said oscillation by said signal at said pair of electrodes, and means connected to said pair of electrodes to derive said modulated oscillation therefrom.

2. A device as claimed in claim 1, in which said piezo-electric member comprises a tubular member of poly-crystalline material, and in which said pair of electrodes comprises an electrode positioned on the outer surface of said tubular member, and an electrode positioned on the inner surface of said member.

3. A device as claimed in claim 1, in which said piezo-electric member has a second pair of electrodes associated therewith, and including means for feeding said modulating signal to said second pair of electrodes, said pairs of electrodes being pre-polarized to cause push-pull modulation of said oscillation thereat, and a tapped impedance member coupled to said pairs of electrodes to derive the push-pull modulated signal therefrom.

4. A device as claimed in claim 1, including an additional pair of electrodes associated with said piezo-electric member, and in which said source of an auxiliary oscillation is connected to said additional pair of electrodes.

5. A device as claimed in claim 4, in which said pairs of electrodes are pre-polarized, the pre-polarization of said additional pair of electrodes being relatively high with respect to that of the pair of electrodes to which said source of a modulating signal is connected.

6. A device as claimed in claim 4, in which said piezo-electric member is elongated along an axis, and in which the length of said additional pair of electrodes in a direction parallel to said axis exceeds that of the pair of electrodes to which said source of a modulating signal is connected.

7. A device as claimed in claim 1, in which said means for coupling said auxiliary oscillation to said member comprises means connected to said member for passing said auxiliary oscillation as a traveling mechanical wave through said member.

8. A device as claimed in claim 1, in which the frequency of said auxiliary oscillation is an integral multiple of a mechanical resonance frequency of said member.

9. A device as claimed in claim 8, in which said pair of electrodes is positioned at a nodal plane of the mechanical vibration of said member.

10. A device as claimed in claim 8, in which the frequency of said auxiliary oscillation is a harmonic of the fundamental mechanical resonance frequency of said member.

11. A device as claimed in claim 1, for simultaneously modulating said oscillation with a plurality of signals, including a plurality of pairs of electrodes associated with said member, a plurality of sources of modulating signals connected respectively to pairs of electrodes of said plurality of pairs of electrodes, said pairs of electrodes being positioned at nodal planes of the mechanical vibration of said member, and means for deriving the modulated oscillations from said pairs of electrodes.

12. A device as claimed in claim 11, in which said piezo-electric member has an elongated shape, said pairs of electrodes being disposed in spaced-apart relationship along the length of said member, and including a plurality of pairs of additional electrodes, groups of two of said pairs of additional electrodes being respectively positioned on said member in the spaces between neighboring ones of said first-named pairs of electrodes, said pairs of additional electrodes being connected electrically to said source of an auxiliary oscillation.

13. A device as claimed in claim 12, in which the pairs of additional electrodes of each said group are pre-polarized in opposite polarities, said auxiliary oscillation being supplied in the same phase to said pairs of additional electrodes.

14. A device as claimed in claim 12, in which said source of auxiliary oscillation comprises a regenerative feedback amplifier having an output terminal and a feedback input terminal, said output terminal being connected to said pairs of additional electrodes, and a further pair of electrodes on said piezo-electric member and connected to said feedback input terminal.

15. A device as claimed in claim 14, in which the regenerative feedback circuit of said amplifier comprises a second piezo-electric member having input and output electrodes associated therewith, said input and output electrodes being connected in series in said feedback circuit.

16. An electrical amplifier circuit comprising a piezo-electric member having at least one pair of electrodes associated therewith, said member having an electro-mechanical coupling factor dependent upon the electric voltage thereacross, a source of an input signal to be amplified, means connected to apply said signal to said pair of electrodes, a source independent of said piezo-electric member for producing an auxiliary oscillation having a frequency higher than the frequency of said signal, means other than said pair of electrodes for coupling said source of auxiliary oscillation to said member to cause mechanical transmission of said auxiliary oscillation to said pair of electrodes thereby producing amplitude modulation of said oscillation by said signal at said pair of electrodes, and an amplitude detector connected to said pair of electrodes to detect said amplitude modulated oscillation and thereby produce an amplified replica of said input signal.

17. An amplifier circuit as claimed in claim 16, in which said amplitude detector is a push-pull type having a pair of input terminals, and including two input circuits connected respectively to said pair of electrodes and to said source of auxiliary oscillation, a first one of said input circuits including a tapped impedance member for providing a push-pull signal, means connected to apply said push-pull signal across said pair of input terminals, and means connecting the second one of said input circuits to said pair of input terminals in cophase relationship.

References Cited in the file of this patent

UNITED STATES PATENTS

| | | |
|---|---|---|
| 1,796,116 | Nicolson | Mar. 10, 1931 |
| 2,274,486 | Koch | Feb. 24, 1942 |
| 2,540,194 | Ellett | Feb. 6, 1951 |
| 2,577,297 | Antranikian | Dec. 4, 1951 |
| 2,611,039 | Hepp | Sept. 16, 1952 |
| 2,616,989 | Hepp | Nov. 4, 1952 |
| 2,669,666 | Mason et al. | Feb. 16, 1954 |
| 2,738,386 | Roberts | Mar. 13, 1956 |